(12) United States Patent
Zhang et al.

(10) Patent No.: US 7,552,026 B2
(45) Date of Patent: Jun. 23, 2009

(54) APS BASED INTEGRATED SUN SENSOR

(75) Inventors: Guangjun Zhang, Beijing (CN); Jie Jiang, Beijing (CN); Qiaoyun Fan, Beijing (CN)

(73) Assignee: Beihang University, Haidian District, Beijing (CN)

( * ) Notice: Subject to any disclaimer, the term of this patent is extended or adjusted under 35 U.S.C. 154(b) by 0 days.

(21) Appl. No.: 11/687,333

(22) Filed: Mar. 16, 2007

(65) Prior Publication Data

US 2008/0029652 A1    Feb. 7, 2008

(30) Foreign Application Priority Data

Aug. 1, 2006    (CN) .................... 2006 1 0103797

(51) Int. Cl.
G06F 3/00 (2006.01)
(52) U.S. Cl. .................. 702/154; 702/150; 702/155; 702/159
(58) Field of Classification Search .............. 702/19, 702/152, 156, 158, 188–190, 150, 154, 155, 702/159; 33/268; 250/208.1; 701/13; 348/113–120, 348/207.99, 227.1, 229.1, 362, 366
See application file for complete search history.

(56) References Cited

U.S. PATENT DOCUMENTS

| 5,546,309 A | * | 8/1996 | Johnson et al. ............... 701/13 |
| 6,490,801 B1 | * | 12/2002 | Hersom et al. ............... 33/268 |
| 6,861,633 B2 | * | 3/2005 | Osborn ................... 250/208.1 |
| 2005/0230598 A1 | * | 10/2005 | Hopkins et al. .......... 250/208.1 |

OTHER PUBLICATIONS

STMicroelectronics, Low-power High-speed RS-485/RS422 Tranceiver ICs from STMicroelectronics, 2008, p. 1, http://www.st.com/stonline/press/news/year2002/p1218c.htm.*

* cited by examiner

*Primary Examiner*—Eliseo Ramos Feliciano
*Assistant Examiner*—Felix E Suarez
(74) *Attorney, Agent, or Firm*—Winston Hsu

(57) ABSTRACT

The disclosure relates to an APS based integrated sun sensor comprising: a diaphragm unit, a detection unit, a processing electronics unit and an interface unit. The diaphragm unit is operatively connected with the detection unit for forming a sunspots image. The detection unit is configured for outputting a gray value of each pixel. The processing electronics unit is operatively connected with the detector unit and the interface unit respectively, for evaluating an attitude angle on the basis of the gray value and coordinate of each pixel. The interface unit is operatively connected with a host computer, for transferring the attitude angle to the host computer. This disclosure has such merits as high accuracy, wide FOV (Field of View), low power consumption, low weight, small size and high update rate.

11 Claims, 17 Drawing Sheets

Memory of centroid corrdinate Xc

| Xc_2 (1,2) | Xc_3 (1,3) | Xc_1 (1,1) | Xc_4 (2,1) | Xc_6 (2,3) | Xc_5 (2,2) | Xc_7 (3,1) | Xc_8 (3,2) | Xc_9 (3,3) | 0......0 |

Row 1 — Row 2 — Row 3

Memory of centroid coordinate Xc

| Xc_2 (1,2) | Xc_3 (1,3) | Xc_1 (1,1) | Xc_4 (2,1) | Xc_5 (2,2) | Xc_7 (3,1) | Xc_8 (3,2) | Xc_9 (3,3) | 0......0 |

Row 1 — Row 2 — Row 3

APS BASED INTEGRATED SUN SENSOR

CROSS-REFERENCE TO RELATED APPLICATIONS

This application claims priority from Chinese Patent Application Serial No. 200610103797.3 filed Aug. 1, 2006, the disclosure of which, including the specification, drawings and claims, is incorporated herein by reference in its entirety.

TECHNICAL FIELD

The present disclosure relates to an attitude sensor in a spacecraft attitude determination system, and more particularly to a new generation micro digital sun sensor utilizing a complementary metal oxide semiconductor ("CMOS") active pixel sensor ("APS") image sensor as a detector.

BACKGROUND

Sun sensors are widely used in spacecraft attitude determination subsystems to provide a measurement of a sun vector in a spacecraft coordinate. Two categories of sun sensors commonly used in the past are an analog sun sensor and an optical coding based digital sun sensor. On the basis of the photovoltaic effect of a photocell, the analog sun sensor outputs analog current. Its resolution and accuracy of determination is too low to meet the requirement of wide field of view ("FOV") and high accuracy in spacecraft attitude determination. Compared with the analog sun sensor, the optical coding based digital sun sensor has higher accuracy, but its heavy photo detector and complicated control of accuracy makes it too large compared to the size of a micro spacecraft or a small rover, and therefore limits the improvement of the accuracy of determination.

A better solution is a charge couple device ("CCD") or a CMOS APS based sun sensor. The CCD and CMOS APS based sun sensors are capable of achieving higher accuracy and avoid the drawbacks mentioned above. Further, with the development of CMOS APS technology, its performance exceeds that of CCD sun sensors, especially in power and anti-radiation. The availability of APS technology (in which detection and an A/D circuit are integrated on a single chip) and micro electro mechanical systems ("MEMES") technology has led to the development of a miniature sun sensor for attitude determination. At the Jet Propulsion laboratory at the California Institute of Technology, there was an ongoing multiyear research of micro sun sensors utilizing MEMES technology. In the project, a silicon wafer mask with multiple apertures was placed on the top of a CMOS APS focal plane array. Sunspots from the apertures were formed on the focal plane when sunlight illuminated on the mask. The attitude angle was capable of being derived by analyzing the precise location of the sunspot centroid on the detector. Although the sun sensor can achieve higher accuracy, the centroid calculation and conversion into attitude angle function are done in spacecraft flight computer, which increases the load of the computer substantially, and basically, the computer has to read all pixels, which limits the update rate of the sun sensor. The sun sensor has concentrated on the optical and accuracy aspects, not on the integration of optical system with process electronics. The research of APS based sun sensor has also been carried out at a number of studies in China. But most of these studies have concentrated on design of the optical system of the sun sensor.

SUMMARY

Accordingly, it is the purpose of the present invention to provide a compact and highly integrated APS based sun sensor, which output attitude angle directly, and to provide a sun sensor with high accuracy, wide FOV (Field of View), low power consumption, low weight, small size and high update rate.

For these purposes, The disclosure relates to an APS based integrated sun sensor comprising: a diaphragm unit, a detection unit, a processing electronics unit and an interface unit. The diaphragm unit is operatively connected with the detection unit for forming a sunspots image. The detection unit is configured for outputting a gray value of each pixel. The processing electronics unit is operatively connected with the detector unit and the interface unit respectively, for evaluating an attitude angle on the basis of the gray value and coordinate of each pixel. The interface unit is operatively connected with a host computer, for transferring the attitude angle to the host computer. This disclosure has such merits as high accuracy, wide FOV (Field of View), low power consumption, low weight, small size and high update rate.

In a representative embodiment, the components of the APS based integrated sensor are as follows. The diaphragm unit is a mask fabricated from 300 micron thick silicon wafers, one side of which is gold coated with apertures array. The detection unit comprises a CMOS APS image sensor. The processing electronics unit is based on an FPGA for realizing all logic control and functionality, which includes a detector drive module, an absent detection and identification of a sunspot module, a centroid calculation module, an attitude evaluation module and an interface protocol module. The interface unit includes a RS422 transceiver.

The present disclosure also is directed to an attitude measurement method of an APS based integrated sun sensor.

Compared with other sun sensors, the present APS based integrated sun sensor has advantages are as following: [1] based on a FPGA, all the logical control and calculation function are implemented, which comprising the driving of the APS, centroid calculation, attitude evaluation and UART protocol, and it works in the pipelining way. [2] With the attitude angle output directly, the present sun sensor is designed compact and integrated by integrating optical mask with processing electronics in a package. [3] The typical size of the present sun sensor is 85×85×45 $mm^3$. It has the weight of 250 g. It achieves the accuracy of 0.05 in 120×120 FOV, and its update rate is 10 Hz. This invention has such merits as small size, low weight and high update rate, therefore, it can meet the requirements of wide FOV (Field of View) and high accuracy in spacecraft attitude determination.

BRIEF DESCRIPTION OF THE DRAWINGS

The accompanying drawings, which are incorporated in and constitute a part of specification, illustrate an exemplary embodiment of the present invention and, together with the general description given above and the detailed description of the preferred embodiment given below, serve to explain the principles of the present invention.

FIGS. 6(a)-6(b) illustrates a centroid coordinates saving sequence of the sunspots;

DETAILED DESCRIPTION

Figure 1:
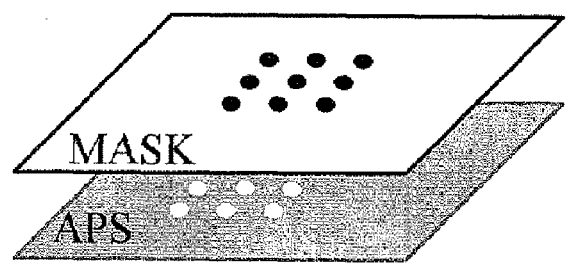
FIGS. 1(*a*) and 1(*b*) illustrates operating principles of an APS based sun sensor.
Figure 1:
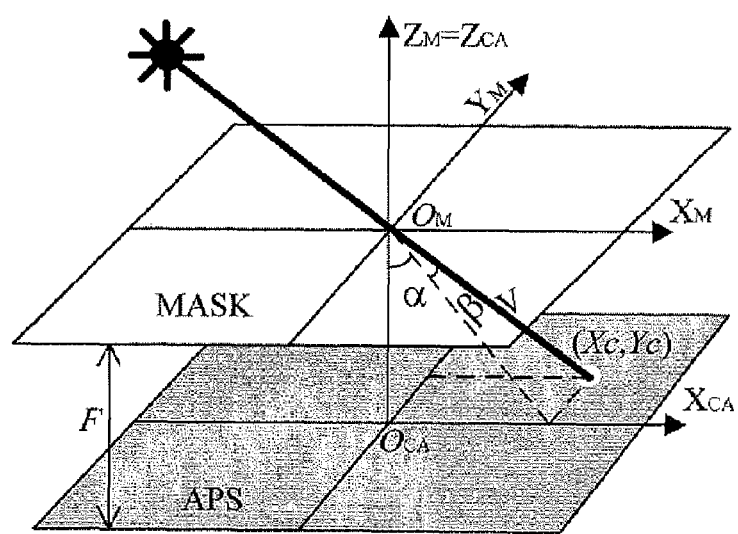

While the claims are not limited to the illustrated embodiments, an appreciation of various aspects of the present invention is best gained through a discussion of various examples thereof. Referring now to the drawings, illustrative embodiments will be described in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

The principle of the present sun sensor is based on the detection of sunspots. As shown by FIG. 1(a), a silicon wafer mask, gold coated with a 3×3 apertures array, is placed on top of an APS detector at a distance of F (shown in FIG. 1(b). An image of the sunspots is formed on the APS detector when sunlight illuminates on the mask. The sunlight incident angle can be derived by analyzing the precise central location of the sunspot. A coordinate system of an aperture is set up as shown in FIG. 1(b). To illustrate, assume that the vector direction of the sunlight in the aperture coordinate system is V, the sunlight incident angles in two orthogonal axes are $\alpha$ and $\beta$ respectively, and the distance between the silicon wafer mask and the APS detector is F. Therefore, the centroid coordinate $(X_C, Y_C)$ and incident angles $\alpha$ and $\beta$ can be expressed as follows:

$$\begin{pmatrix} X_C \\ Y_C \end{pmatrix} = \begin{pmatrix} F * \tan\alpha \\ -F * (\tan\beta/\cos\alpha) \end{pmatrix} \quad (1)$$

$$\alpha = \arctan(X_C/F)$$

$$\beta = \arctan\left(Y_c / \sqrt{X_C^2 + F^2}\right)$$

In one embodiment, the mask is fabricated from 300 micron thick silicon wafers, one side of which is gold coated with the 3×3 apertures array. In addition, an optical system with optimized parameters can improve the accuracy of the sun sensor. The parameters can be determined by the following factors: relative spectral distribution of sunlight, responsive property and sensitivity of the CMOS APS, optimum area of the sunspot and FOV expected to be achieved. Accordingly, in the present sun sensor, an aperture diameter is approximately 50 μm, space between apertures is approximately 250 μm, the distance F between the mask plane and the APS focal plane is approximately 3.5 mm, and the sun sensor is made only sensitive in 1.0 μm~1.1 μm spectrum band.

Figure 2:
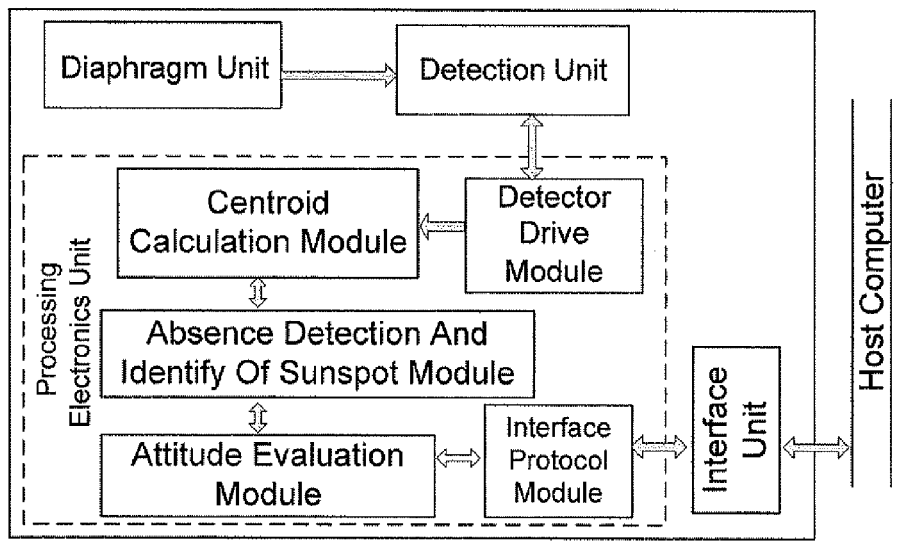
FIG. 2 illustrates an architecture diagram of the present sun sensor.

FIG. 2 illustrates the present APS based integrated sun sensor that comprises a diaphragm unit, a detection unit, a processing electronics unit and an interface unit. In one embodiment, the diaphragm unit, which is operatively connected with the detection unit, is a mask fabricated from approximately 300 micron thick silicon wafers with a 3×3 apertures array. The processing electronics unit is operatively connected with the detector unit and the interface unit respectively. The interface unit is operatively connected with a host computer.

In the embodiment illustrated, the detection unit is a CMOS APS image sensor. The processing electronics unit is based on a field programmable gate array ("FPGA") for realizing all logic control and functionality, which includes a detector drive module, an absent detection and identification of a sunspot module, a centroid calculation module, an attitude evaluation module and an interface protocol module. In one embodiment, the interface unit is operatively connected with the host computer by an RS422 transceiver.

Figure 3:
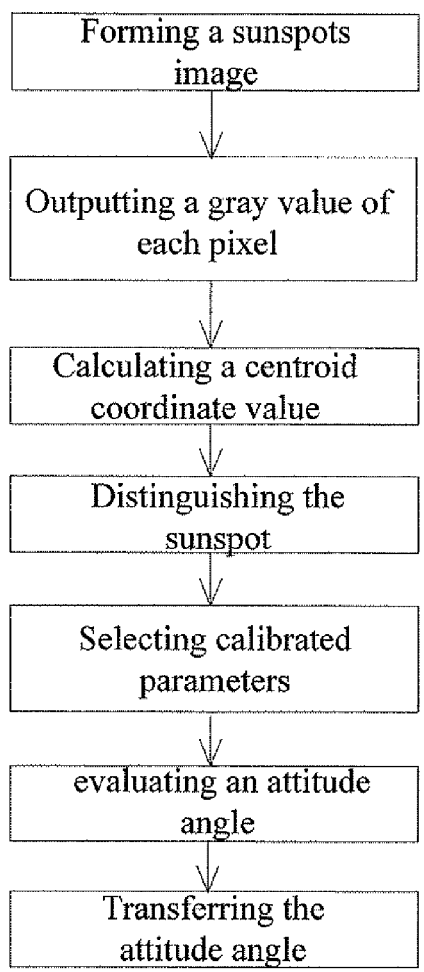
FIG. 3 illustrates a workflow diagram of the present sun sensor.
Figure 4A:
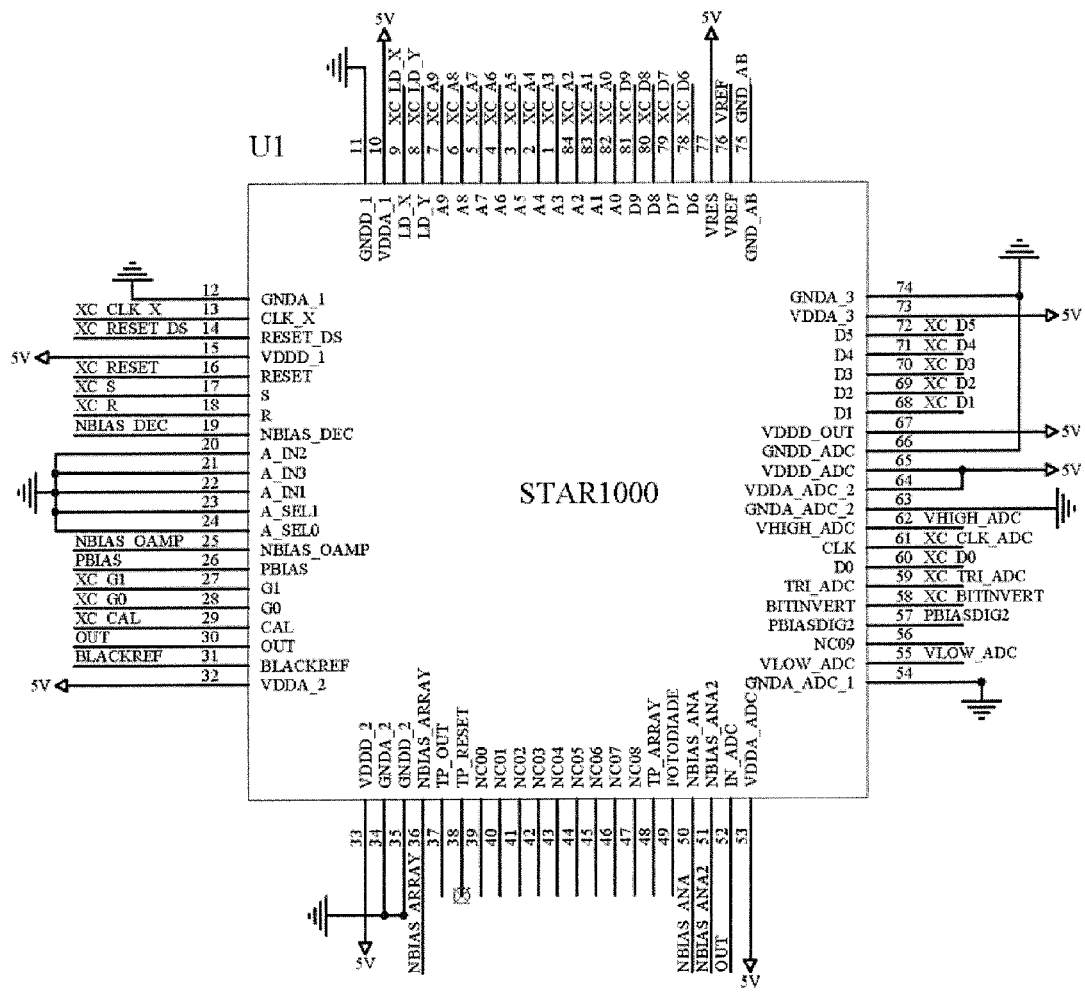
FIGS. 4A-4L illustrate an electric circuit diagram of the present sun sensor.
Figure 4B:
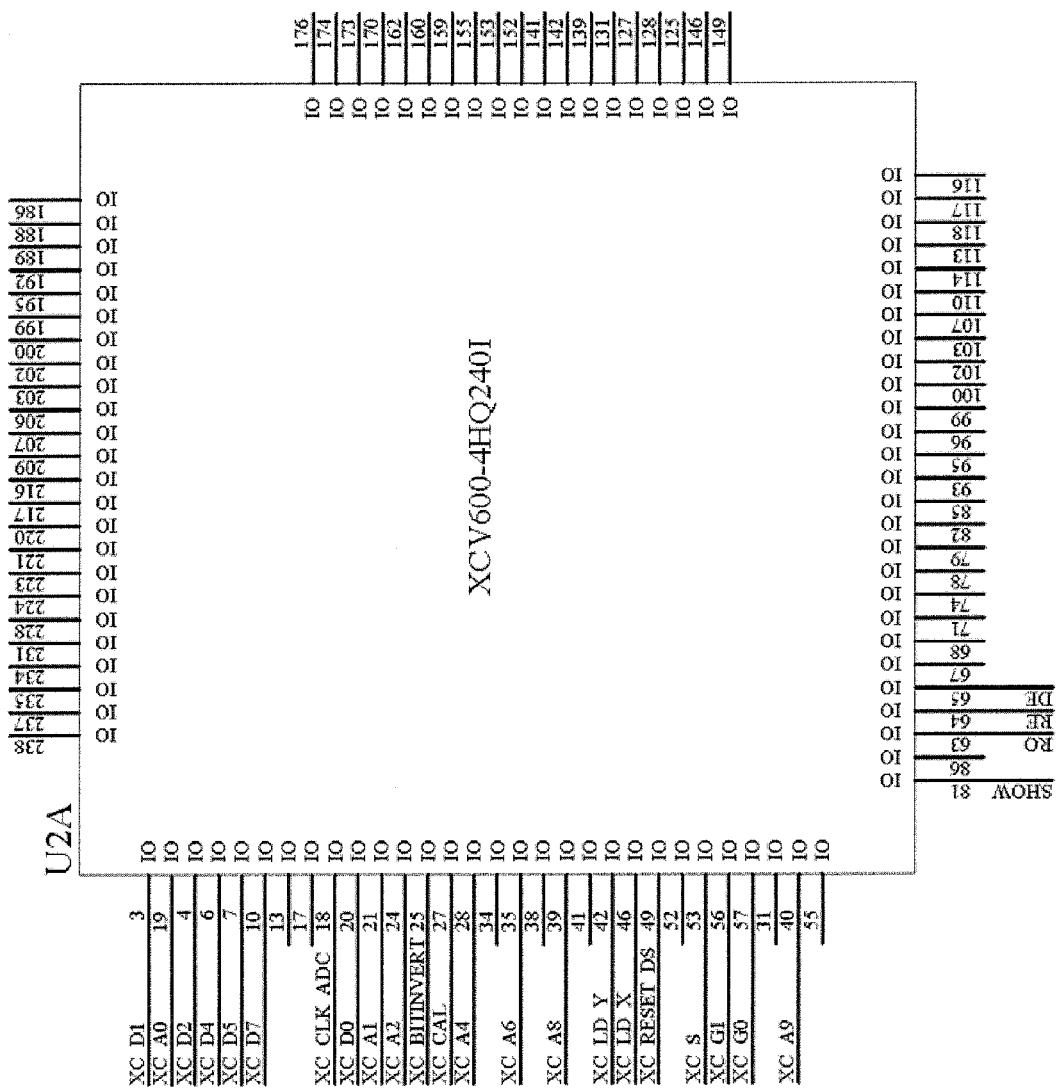
Figure 4C:
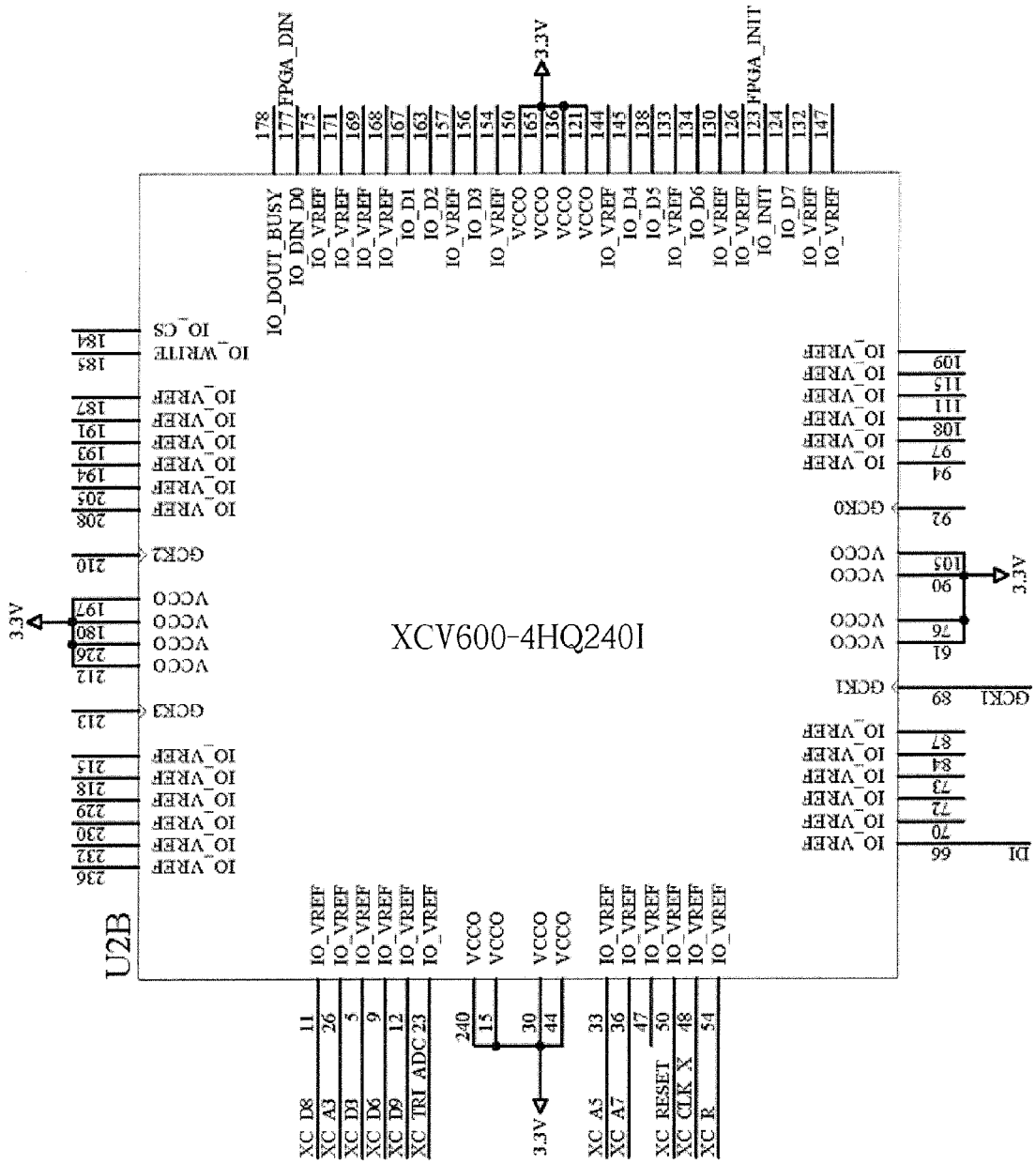
Figure 4D:
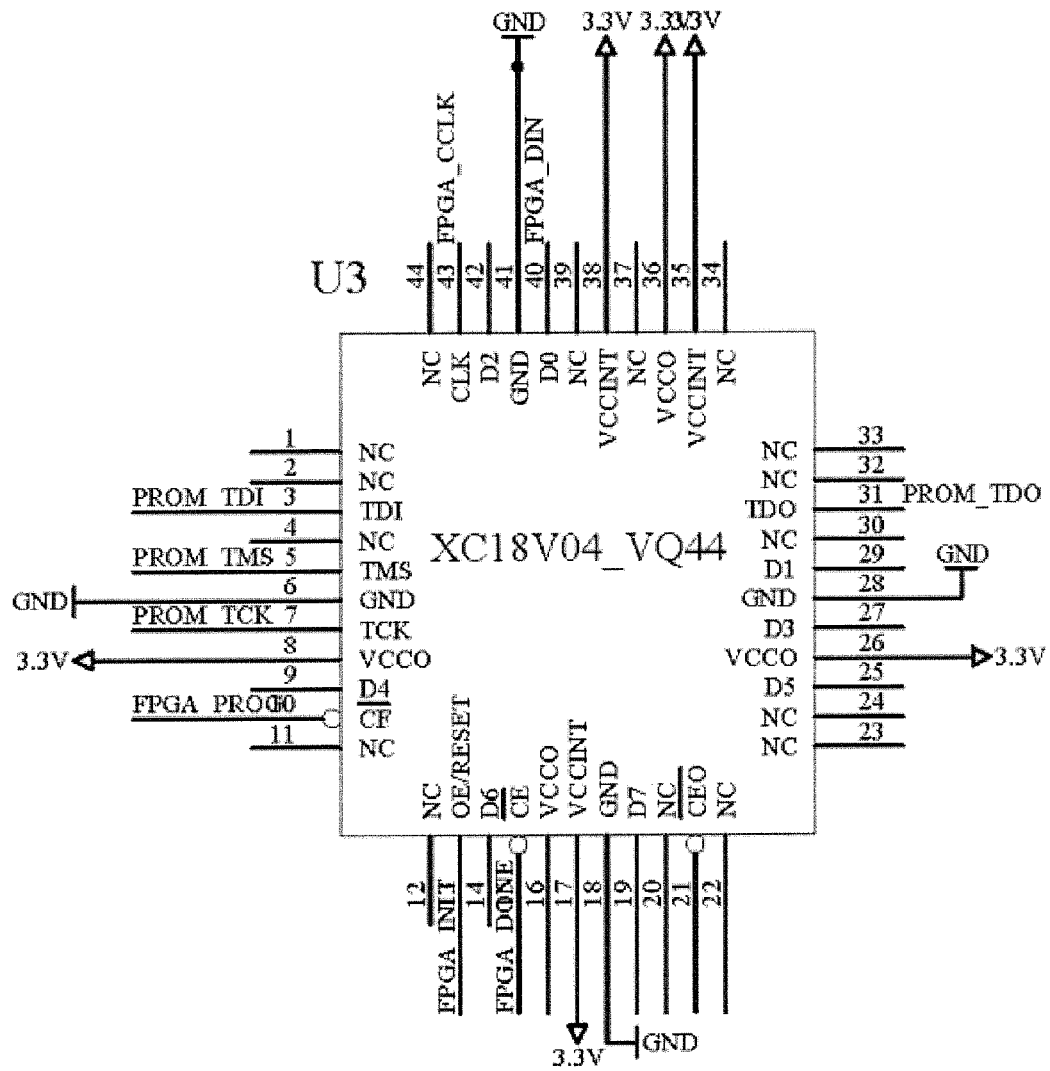
Figure 4E:
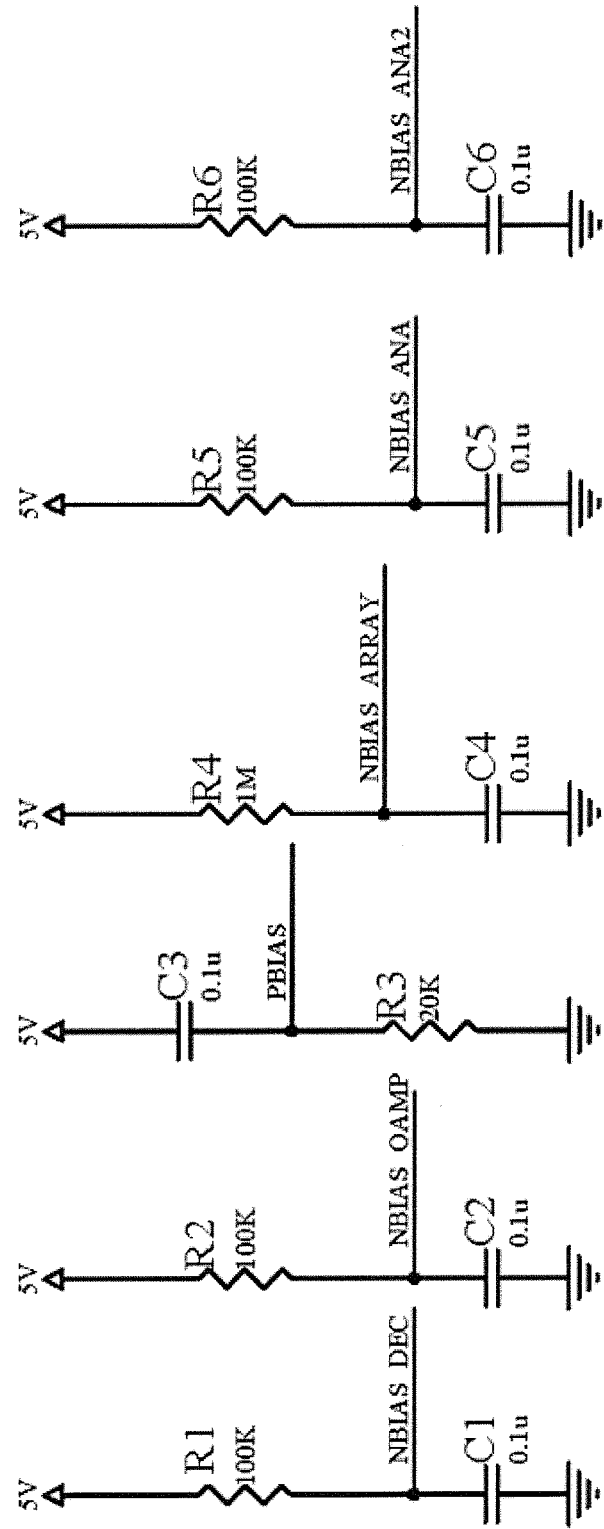
Figure 4F:
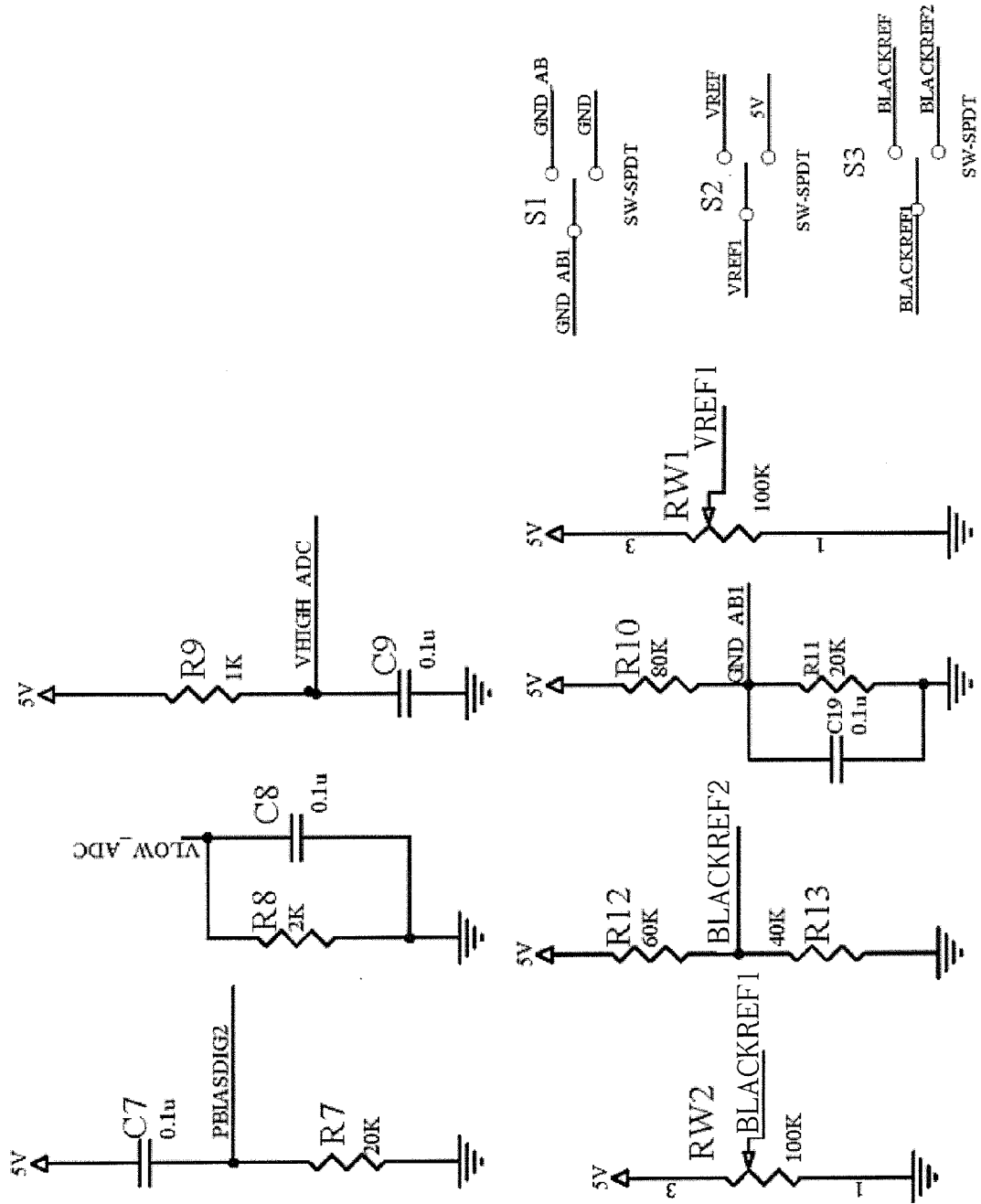
Figure 4G:
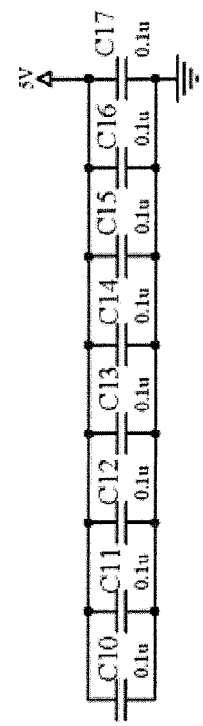
Figure 4H:
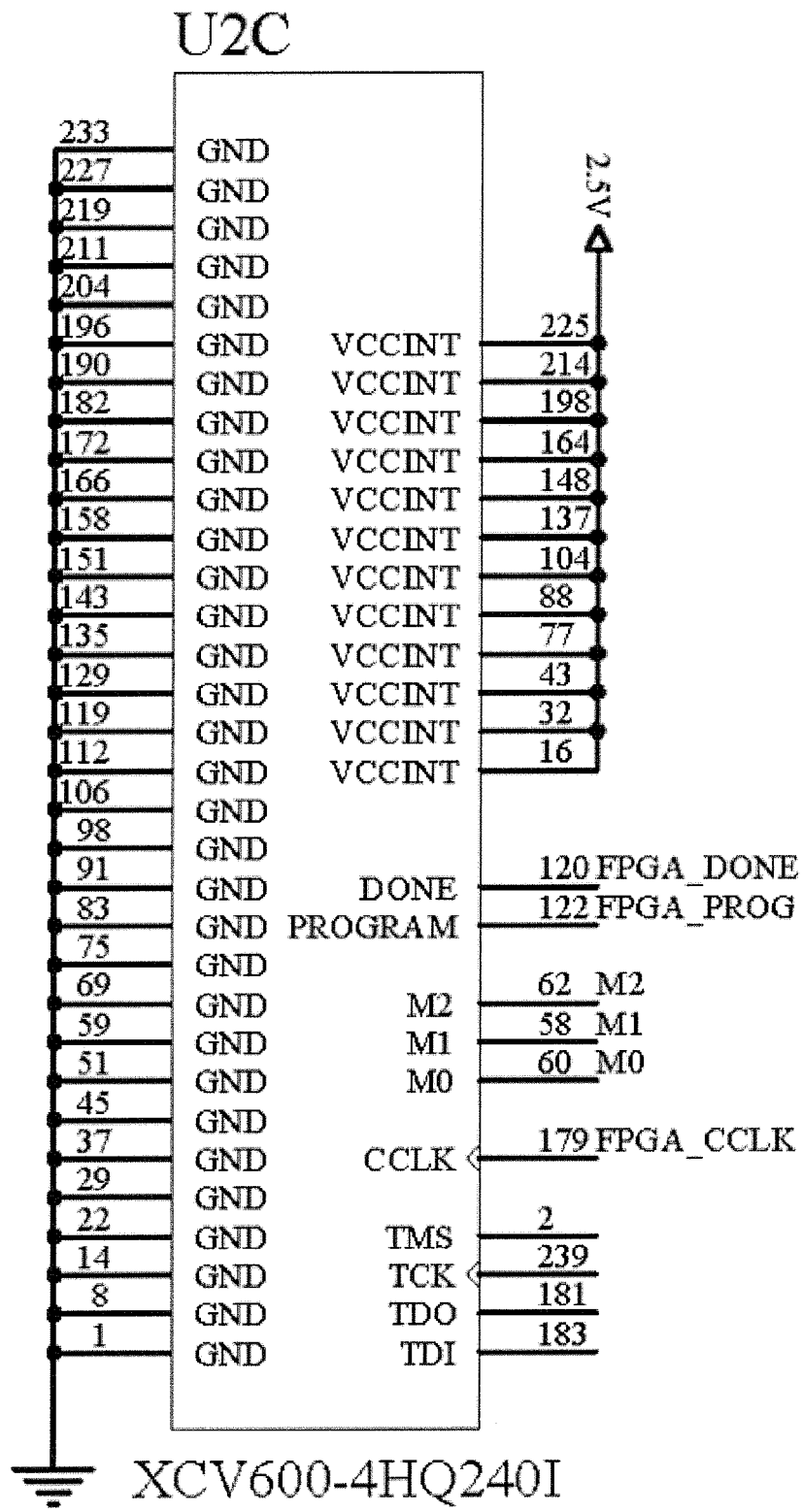
Figure 4I:
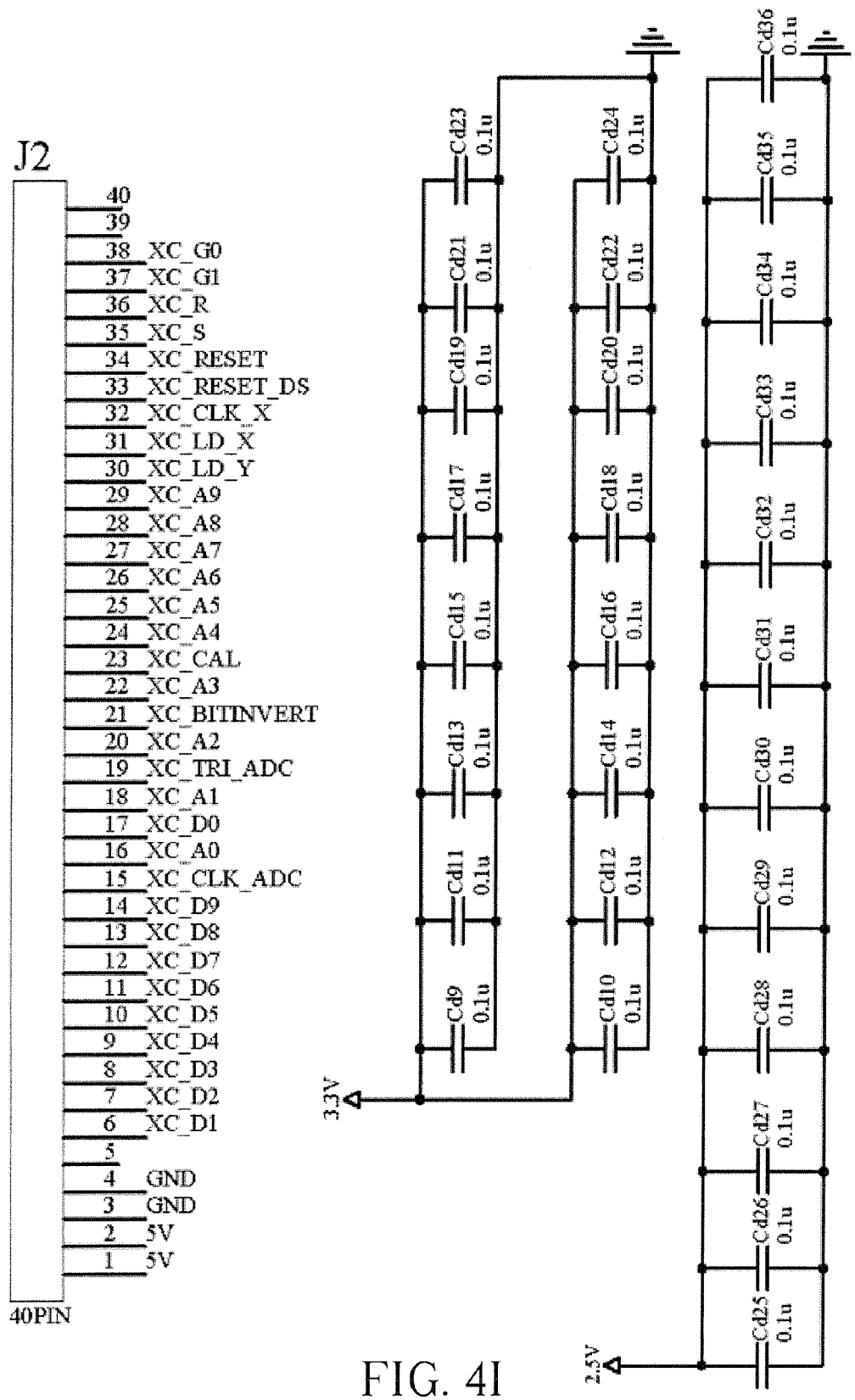
Figure 4J:
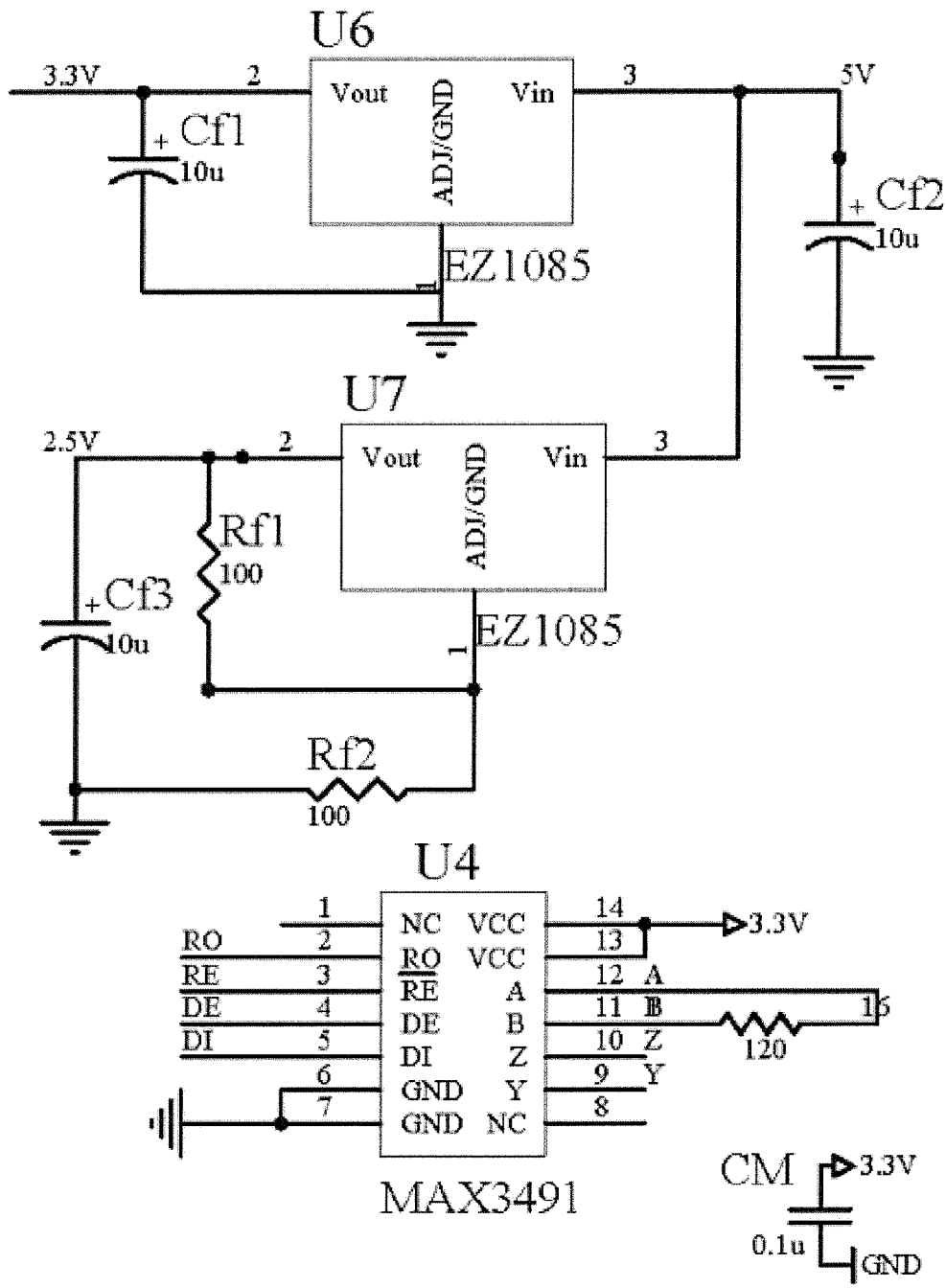
Figure 4K:
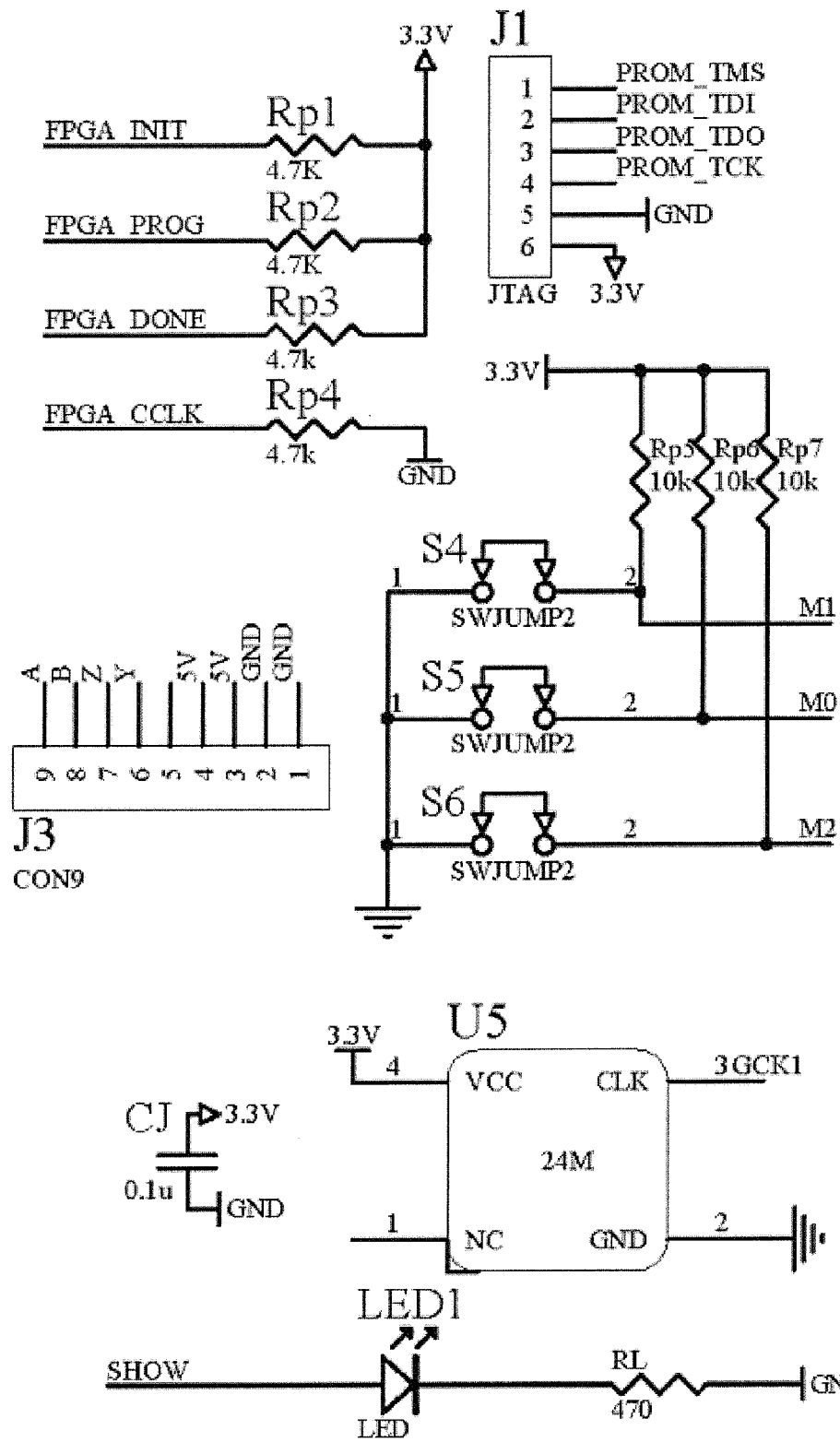
Figure 4L:
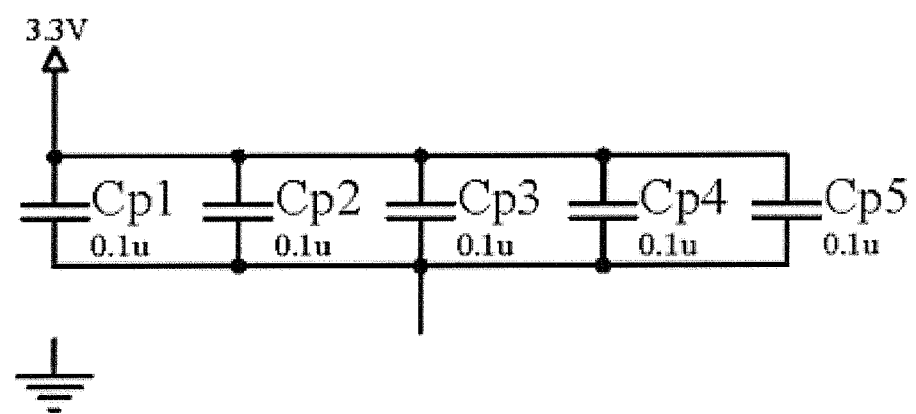

FIG. 3 illustrates the operating process of an altitude measurement method of an APS based integrated sun sensor. The description of the altitude measurement method is as follows:

First, sunlight is incident on the CMOS APS detector through the mask placed on top of the APS at a distance of approximately 3.5 mm. An image of the sunspots is formed on the CMOS APS, and a gray value I(x,y) and a coordinate value (x,y) of each pixel of the image is output row by row to the centroid calculation module of the processing electronics unit. The centroid calculation module distinguishes the sunspot and calculates the centroid coordinate value (Xc,Yc) of each sunspot utilizing a first-moment centroid algorithm, then saves the centroid coordinate value in a centroid Xc/Yc memory.

Second, the absent detection and identifaction of the sunspot module of the processing electronics unit reads the centroid coordinate value (Xc,Yc) from the Xc/Yc memory, and identifies the row index n and column index m of each sunspot. In accordance with n and m, calibrated parameters $x_{0\_nm}$, $y_{0\_nm}$, $\sin\phi_{nm}$, $\cos\phi_{nm}$, $F'_{nm}$, $\alpha_{0\_nm}$, $\beta_{0\_nm}$ for each aperture are selected. And then, those parameters and the centroid coordinate value (Xc,Yc) are transferred to the attitude evaluation module of the processing electronics unit.

Third, based on a coordinate rotation digital computer ("CORDIC") algorithm, the attitude evaluation module calculates the sunlight incident angle $\alpha_{nm}, \beta_{nm}$ for each aperture. CORDIC is an iterative algorithm for calculating triangle function. It suits hardware implementation because it does not require any multiplier After all the sunlight incident angles $\alpha_{nm}, \beta_{nm}$ have been calculated, the attitude evaluation module gets the final attitude angle $\alpha$, $\beta$ by averaging those angles together. Finally, according to a universal asynchronous receiver transmitter UART protocol, the interface protocol module transfers the attitude angle $\alpha$, $\beta$ to the RS422 transceiver. In this manner, communication with the host computer is implemented.

FIGS. 4A-4L, illustrate the electric circuit diagram of the present sun sensor. In these figures, U1 represents the CMOS APS (STAR1000 from Fillfactory), U2 represents the FPGA (XCV600-HQ2401 from Xilinx), U3 is configuration EEPROM XC18V04-VQ44 for FPGA, U4 is the RS422 transceiver MAX3491. U5 is a crystal oscillator of 24 MHz. U5 and U7 are DC regulators of 3.3V and 2.5V respectively. Resistors R1 . . . R11 and capacitors C1 . . . C9 are peripheral elements of the corresponding pin of the CMOS. Capacitors C10 . . . C17 are power filters of the CMOS. Adjustable resistors RW1 and RW2 are used for reset level setting of the CMOS. S1, S2, S3 are used for reset mode selection. Resistors Rf1, Rf2 adjust output voltage of the 2.5V DC regulator, and Cf1 . . . Cf3 are filter capacitors for the DC regulator. Rp1 . . . Rp4 are pull-up resistors for the configuration pin of EEPROM. Capacitors Cp1 . . . Cp4 are power filters of EEPROM. S4, S5, S6 are used for configuration modes selection. Capacitors Cd9 . . . Cd36 are power filters of FPGA.

Capacitors CJ and CM are power filters for the crystal oscillator and MAX3491 respectively. LED1 indicates configuration finish. J2 connects FPGA with CMOS, J3 connects MAX3491 with the host computer. J1 is the connector for downloading the configuration information.

On power-up, the present sun sensor loads the configuration bit stream from EEPROM into FPGA using the selected configuration mode. After configuration finish, the CMOS APS image sensor starts to output the gray value of each pixel, row by row. Once those values are acquired, FPGA calculates the centroid coordinate of each sunspot and evaluates the attitude angle. And then, the attitude angle is transferred to the RS422 transceiver. Then, LVTTL signals from FPGA are converted to signals compatible with RS422, and communication with the host computer is implemented.

The key component of the processing electronics unit is the FPGA. The functionality modules implemented in it are as follows:

1. CMOS APS Drive

According to the timing and control logic of the CMOS APS STR1000, the APS drive module controls the CMOS APS to output the gray value of each pixel row by row.

2. Centroid Calculation

Based on the first-moment centroid algorithm, the centroid calculation module calculates the precise central location of the sunspots. If the sunspot on the APS detector is contained in a window of M rows and N columns, its centroid coordinate is calculated by the following equations:

$$Xc = \frac{1}{I_{total}} \sum_{r=1}^{M} \sum_{h=1}^{N} Xr * I(r, h), \quad (2)$$

$$Yc = \frac{1}{I_{total}} \sum_{r=1}^{M} \sum_{h=1}^{N} Y_h * I(r, h)$$

Where $$I_{total} = \frac{1}{I_{total}} \sum_{r=1}^{M} \sum_{h=1}^{N} I(r, h) \cdot Xc, \quad Yc$$

is the centroid coordinate value calculated, r is the row index, h is the column index, $Xr$, $Y_h$ is a coordinate of the (r,h) pixel, $I(r,h)$ is the gray value of the (r,h) pixel. The Centroid calculation module reads $I(x,y)$ and $(x,y)$ row by row, and marks the pixels of which the gray value exceeds the threshold. According to the marks, it distinguishes the sunspot and calculates the values $$\sum_{r=1}^{M} \sum_{h=1}^{N} Xr * I(r, h), \quad \sum_{r=1}^{M} \sum_{h=1}^{N} Y_h * I(r, h)$$

and $I_{total}$ of each sunspot, and then, it gets the centroid coordinate by equations (2). The detailed implementation of this algorithm can be seen in a co-pending patent application "RAPID AND HIGH PRECISION CENTROIDING METHOD AND SYSTEM FOR SPOTS IMAGE" applied by Guangjun zhang etc, the contents of which are incorporated herein by reference in its entirety. With this centroid algorithm done in FPGA, massive data transferring to a PC may be avoided, and the sun sensor may achieve higher accuracy and update rate.

3. Absence Detection and Identify of Sunspots

Figures 5, 6:
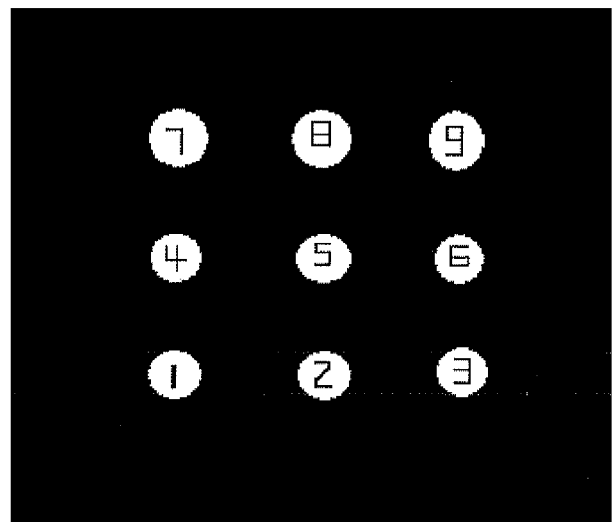
FIG. 5 illustrates a sunspot imaging.

Utilizing the centroid algorithm mentioned above, centroid coordinates of the sunspots are saved in the Xc/Yc memory. From the character of the image and implementation of the centroid algorithm, it can be known that the centroid coordinates are not sequentially saved according to the index of the sunspots. Instead, the centroid coordinates are saved by rows, while those in the same row are saved at random. For example, the saving sequence for the image shown in FIG. 5 may result in the sequence shown in FIG. 6*a*. Those in brackets are the row index and column index of the sunspots, and the Yc saving sequence is the same as Xc.

In application, individual apertures may be opaque due to the defiled mask, which can lead to a sunspot absence of the image. For the same image shown in FIG. 5, if sunspot 6 is absent, the saving result will be that shown in FIG. 6*b*. To simplify the calculation, the absence detection should be done first, namely, if some aperture in a row is absent, the others in same row are excluded from the attitude evaluation subsequently. From the character of the image, it can be known that a difference of centroid coordinates Yc of sunspots in the same row are always less than 10 pixels, while those in different rows are more than 10 pixels. According to the character of above mentioned, Yc (which saving sequences are the same as Xc in FIG. 6*b*) is read sequentially from the memory and the difference between adjacent saved sunspots is calculated. At the same time, the amount L of sunspots read is counted. If the difference exceeds 10 pixels before the value L reaches 3, absence of a sunspot in this row is detected. Otherwise, this row is complete. And then, by comparing the value of Xc in this row, column index of the sunspots in this row can be identified.

4. Attitude Evaluation

Figure 7:
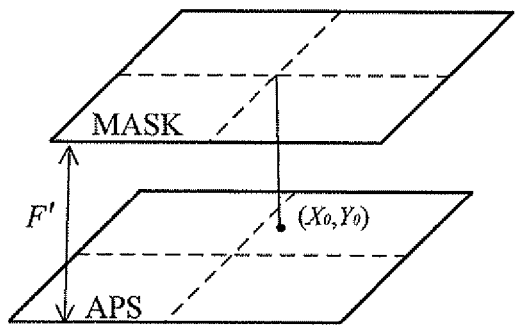
FIG. 7 illustrates an installation error.
Figure 7:
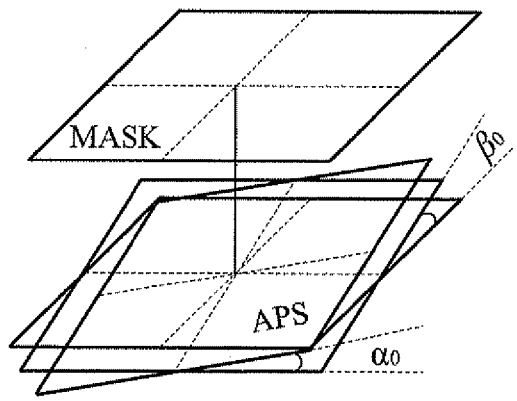
Figure 7:
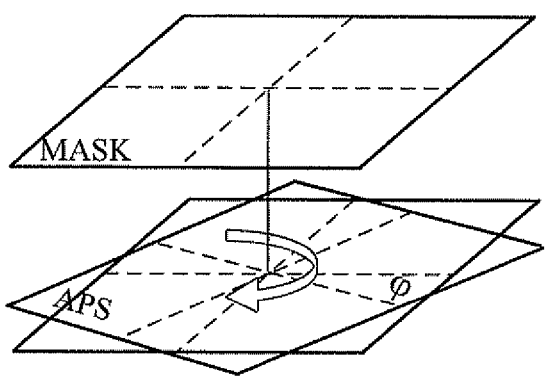

Equation (1) of the sunlight incident angle is for the ideal situation shown in FIG. 1(*b*). There is installation error in an actual application as shown in FIG. 7. The parameters are described as follows:

(a) The aperture centroid intersects the image detector in the coordinate $(x_0, y_0)$ not the coordinate $(0,0)$;

(b) The distance between the detector focal plane and the mask plane is not theoretic value F. Assuming F' is the actual value thereof;

(c) The detector focal plane is not completely parallel with the mask plane, assuming $\alpha_0$ and $\beta_0$ are the offsets in two orthogonal axes;

(d) The detector focal plane may also rotate around axis zenith to mask plane, assuming $\phi$ is the rotated angle.

The Equation of the sunlight incident angle with consideration of installation error can be written as:

$$\alpha = \arctan\left[\frac{(X_c - x_0)\cos\varphi + (Y_c - y_0)\sin\varphi}{F'}\right] + \alpha_0 \quad (3)$$

$$\beta = \arctan\left[\frac{(X_c - x_0)\sin\varphi - (Y_c - y_0)\cos\varphi}{\sqrt{F'^2 + [(X_c - x_0)\cos\varphi + (Y_c - y_0)\sin\varphi]^2}}\right] + \beta_0 \quad (4)$$

Where (Xc,Yc) is the centroid coordinate value and F', $x_0$, $y_0$, $\alpha_0$, $\beta_0$, $\phi$ are calibrated parameters for (n,m) aperture. It can be seen from the equations (3) and (4) that the evaluation of the sunlight incident angle refers to arctangent, square root, square sum, multiplication, division, addition and subtraction function.

For the arctangent function, the traditional algorithms are based on lookup table polynomial expansion and rational function approximation. Those algorithms cannot achieve higher precision and speed at the same time. Furthermore, they are not suited for FPGA implementation. A better solution is a CORDIC algorithm. CORDIC is an iterative algorithm for calculating a triangle function. It suits FPGA implementation because it does not require any multiplier.

For the calculus $$\sqrt{F'^2+[(X_c-x_0)\cos\phi+(Y_c-y_0)\sin\phi]^2},$$

If it is treated as mod of complex number $A+Bi$ instead of square root of $A^2+B^2$, where $$A=F', B=[(X_c-x_0)\cos\phi+(Y_c-y_0)\sin\phi]$$

and implemented utilizing the CORDIC algorithm, the gate resources required in an FPGA will be greatly reduced.

Based on the CORDIC algorithm, the arctangent function, square function and square root function can be effectively implemented in FPGA.

Figure 8:
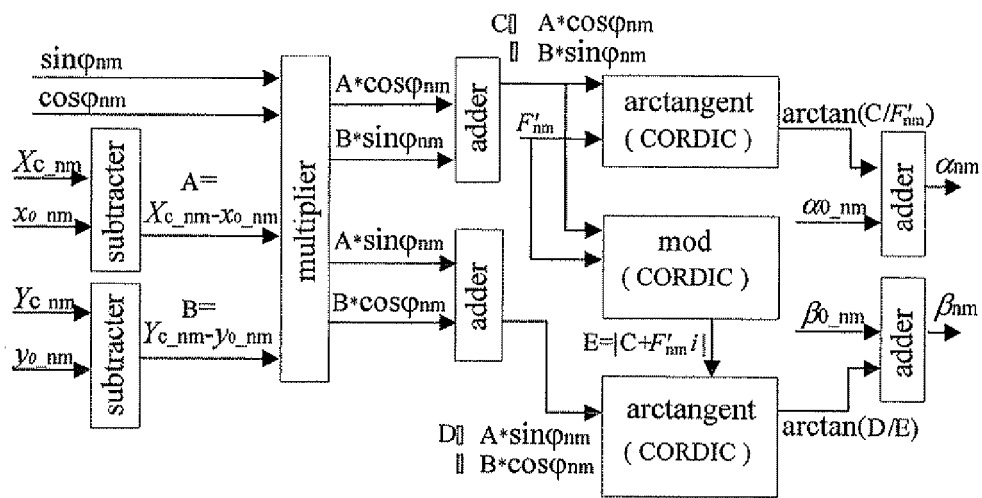
FIG. 8 illustrates an attitude calculation for a aperture.

FIG. 8 shows the calculation flow diagram of attitude evaluation for an aperture in FPGA. After reading a centroid coordinate value $(X_{c\_nm}, Y_{c\_nm})$ and calibrated parameters $x_{0\_nm}, y_{0\_nm}, \sin\phi_{nm}, \cos\phi_{nm}, F'_{nm}, \alpha_{0\_nm}, \beta_{0\_nm}$, the attitude evaluation module calculates the sunlight incident angle $\alpha_{nm}, \beta_{nm}$ for each aperture in the way as FIG. 8 shows. All the incident angles $\alpha_{nm}, \beta_{nm}$ except that in the row which has sunspot absent are added up, then the final attitude angle $\alpha, \beta$ are obtained by averaging them.

5. UART Protocol

According to UART protocol, the interface protocol module transfers the attitude angle $\alpha, \beta$ to RS422 transceiver. By which, LVTTL signals from FPGA are converted to signals compatible with RS422, and communication with the host computer is implemented.

The foregoing description of various embodiments of the invention has been present for purpose of illustration and description. It is not intent to be exhaustive or to limit the invention to the precise embodiments disclosed. Numerous modifications or variations are possible in light of the above teachings. The embodiments discussed where chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An active pixel sensor based integrated sun sensor comprising:

a diaphragm unit;

a detection unit;

a processing electronics unit; and an interface unit;

wherein the diaphragm unit is operatively connected with the detection unit for forming a sunspots image; and wherein the detection unit is configured for outputting a gray value of each pixel of the sunspots image;

wherein the processing electronics unit is operatively connected with the detector unit and the interface unit respectively for evaluating an attitude angle on the basis of the gray value and a coordinate of each pixel of the sunspots image; the processing electronics unit includes an absence detection and identification of a sunspot module configured to detect an absence of a specific sunspot in the sunspots image detected by the detection unit according to sunspots included in the sunspots image; and wherein the interface unit is operatively connected with a host computer for transferring an attitude angle to the host computer.

2. The active pixel sensor based integrated sun sensor according to claim 1, wherein the diaphragm unit is a mask fabricated from 300 micron thick silicon wafers, wherein one side of the mask is gold coated with an apertures array.

3. The active pixel sensor based integrated sun sensor according to claim 2, wherein the detection unit comprises a complementary metal oxide semiconductor active pixel image sensor.

4. The active pixel sensor based integrated sun sensor according to claim 3, wherein the processing electronics unit is based on a field programmable gate array (FPGA) for realizing all logic control and functionality thereof, and the processing electronics unit further includes a detector drive module, a centroid calculation module, an attitude evaluation module and an interface protocol module.

5. The active pixel sensor based integrated sun sensor according to claim 4, wherein the interface unit includes an RS422 transceiver.

6. The active pixel sensor based integrated sun sensor according to claim 1, wherein the processing electronics unit further includes a centroid calculation module configured to calculate a centroid coordinate of each sunspot in the sunspots image according to the gray value of each pixel of the sunspots image, and the absence detection and identification of sunspot module detects and identifies sunspots image based on the centroid coordinate of each sunspot in the sunspots image.

7. The active pixel sensor based integrated sun sensor according to claim 1, wherein the diaphragm unit has an apertures array having a plurality of apertures; sunlight incident on the detection unit through the plurality of apertures forms sunspots in a plurality of rows of the sunspots images; the processing electronics unit further includes an attitude evaluation module configured to perform an attitude evaluation; and when the absence detection and identification of sunspot module detects a sunspot absence in a specific row of the sunspots image, each sunspot in the specific row of the sunspots image is excluded from the attitude evaluation.

8. An attitude measurement method of an active pixel sensor based integrated sun sensor comprising the following steps:

exposing sunlight on a detection unit such that the sunlight is incident on the detection unit through a diaphragm unit to form a sunspots image on the detection unit;

outputting a gray value of each pixel by the detection unit;

evaluating an attitude angle by a processing electronics unit on the basis of the gray value and a coordinate of each pixel; and transferring an attitude angle to a host computer by an interface unit;

wherein the step of evaluating attitude angle by the processing electronics unit comprises:

(1) the step of the centroid calculation module reading the gray value and coordinate value of each pixel row by row, and marking the pixels of which the gray value exceeds the threshold; and according to the marks, distinguishing each sunspot of the sunspots image; and calculating a centroid coordinate value of each sunspot utilizing a first-moment centroid algorithm, then saving those centroid coordinate values in an Xc/Yc memory;

(2) the step of the absent detection and identification of sunspot module reading the centroid coordinate value from the Xc/Yc memory and identifying a row index and column index of each sunspot of the sunspots image; and in accordance with the identified row and column indices, calibrating parameters $x_{0\_nm}$, $y_{0\_nm}$, $\sin\phi_{nm}$, $\cos\phi_{nm}$, $F'_{nm}$, $\alpha_{0\_nm}$, $\beta_{0\_nm}$ for each aperture of the diaphragm unit are selected; then the calibrated parameters together with the centroid coordinate value are transferred to an attitude evaluation module; and (3) based on a coordinate rotation digital computer algorithm, the attitude evaluation module of the processing electronics unit next calculates a sunlight incident angle for each sunspot; after all the sunlight incident angles have been calculated, the attitude evaluation module obtains the final attitude angles by averaging the values of the sunlight incident angles for each sunspot.

9. The attitude measurement method of an active pixel sensor based integrated sun sensor according to claim 8, wherein the diaphragm unit forms a sunspots image through a silicon wafer mask with an apertures array.

10. The attitude measurement method of an active pixel sensor based integrated sun sensor according to claim 8, wherein the detection unit which is driven by a detector drive module of the processing electronics unit, outputs the gray value of each pixel row by row.

11. The attitude measurement method of an active pixel sensor based integrated sun sensor according to claim 8, wherein the attitude evaluation considers installation error between the diaphragm unit and the detection unit, and the sun incident angle for a sunspot is calculated as:

$$\alpha = \arctan\left[\frac{(X_c - x_0)\cos\varphi + (Y_c - y_0)\sin\varphi}{F'}\right] + \alpha_0$$

$$\beta = \arctan\left[\frac{(X_c - x_0)\sin\varphi - (Y_c - y_0)\cos\varphi}{\sqrt{F'^2 + [(X_c - x_0)\cos\varphi + (Y_c - y_0)\sin\varphi]^2}}\right] + \beta_0$$

Where (Xc, Yc) is centroid coordinate value and F', $x_0$, $y_0$, $\alpha_0$, $\beta_0$, $\phi$ are calibrated parameters for (n,m) aperture.

* * * * *